United States Patent [19]
Peters et al.

[11] Patent Number: 5,231,535
[45] Date of Patent: Jul. 27, 1993

[54] SIMULTANEOUS INDIVIDUAL FOCUS BINOCULARS

[75] Inventors: Victoria J. Peters, Forest Grove; Rodney H. Otteman, Aloha; Klaus P. Mahr, Portland; Neil Mai, Beaverton; Forrest Babcock, Banks, all of Oreg.

[73] Assignee: Leupold & Stevens, Portland, Oreg.

[21] Appl. No.: 786,124

[22] Filed: Nov. 1, 1991

[51] Int. Cl.⁵ .................... G02B 23/18; G02B 7/06
[52] U.S. Cl. .................... 359/414; 359/416; 359/418
[58] Field of Search ............... 359/413–416, 359/408–412, 418, 419

[56] References Cited

U.S. PATENT DOCUMENTS

| D. 292,412 | 10/1987 | Janke et al. | D16/133 |
|---|---|---|---|
| 1,514,419 | 11/1924 | Berggren | 359/414 |
| 4,080,042 | 3/1978 | Hornschu et al. | 359/416 |
| 4,080,043 | 3/1978 | Altenheiner et al. | 359/416 |
| 4,087,153 | 5/1978 | Hengst | 350/76 |
| 4,202,598 | 5/1980 | Jenkins | 359/414 |
| 4,306,764 | 12/1901 | Kikuchi | 359/414 |
| 4,346,960 | 8/1982 | Lehrmund et al. | 350/76 |
| 4,436,387 | 5/1984 | Shimizu | 350/556 |
| 4,630,901 | 12/1986 | Altenheiner et al. | 350/552 |
| 4,913,591 | 4/1990 | Wakayama et al. | 350/546 |
| 4,989,963 | 2/1991 | Farnung et al. | 350/556 |
| 4,998,357 | 3/1991 | Farnung et al. | 350/556 |

FOREIGN PATENT DOCUMENTS

| 1236411 | 6/1986 | U.S.S.R. | 359/418 |
|---|---|---|---|
| 5287 | of 1890 | United Kingdom | 359/418 |

*Primary Examiner*—Jon W. Henry
*Attorney, Agent, or Firm*—Stoel Rives Boley Jones & Grey

[57] ABSTRACT

Binoculars capable of simultaneous individual focus and simultaneous individual focus mechanisms therefor are discussed. The binoculars of the present invention are preferably offset hinged in the bridging portion to accommodate various users and for compactness. In addition, the binoculars of the present invention simulate the ease of center focus and combat parallax that results from misalignment of the optical axis and the mechanical axis of each binocular tube.

15 Claims, 4 Drawing Sheets

SIMULTANEOUS INDIVIDUAL FOCUS BINOCULARS

TECHNICAL FIELD

The present invention relates to apparatus incorporating two focusing elements. More specifically, the present invention relates to simultaneous individual focus binoculars.

BACKGROUND OF THE INVENTION

Many types of binoculars (i.e., dual refractory telescopes) are known, commercially available and include, among other things, two binocular tubes, each with an eyepiece and an objective assembly associated therewith. Relative positioning of the corresponding eyepieces and objective assemblies and correction for the vision of an individual user results in the observation of a clear and sharp image by the user (i.e., "focus"). Traditionally, individual focus binoculars have been focussed by a user through rotation of the eyepiece or the objective assembly. Such rotation may result in misalignment of the mechanical and optical axes of either or both binocular tubes, and parallax may, in turn, result from such misalignment.

Prior art binoculars generally employ either center focus or individual focus mechanisms. Center focus is achieved by a user through the adjustment of a single knob, typically located in the central portion of the structure (i.e., the bridge between the two binocular tubes) at or near the eyepiece end thereof. In contrast, individual focus is achieved by a user through dual adjustment features, each typically located in a contacting relationship with a corresponding binocular tube. U.S. Pat. No. Des. 292,412 is directed to eyepiece-rotational, individual focus binoculars exhibiting a hinge-like bridge structure for storage compactness.

U.S. Pat. No. 4,346,960 issued to Lehrmund et al. discusses binoculars having a first "ganged" control to axially adjust both objectives simultaneously and a second "single" control to axially and independently adjust one objective. More specifically, the single control provides for adjustment of the objective assembly located within one binocular tube to the exclusion of adjustment of the objective positioned in the other tube. Binoculars described in this patent exhibit a double-jointed central portion.

Similarly, U.S. Pat. No. 4,630,901 issued to Altenheiner et al. discusses binoculars having a dual knob control structure, where one knob is capable of joint focusing of both optical elements (i.e., combinations of corresponding eyepieces and objective assemblies), and the other knob is capable of adjusting an individual objective assembly to correct for defects in a user's vision. Longitudinal adjustment of objective position is employed in the patented apparatus. In addition, these patented binoculars exhibit a hinged central portion.

U.S. Pat. No. 4,989,963 issued to Farnung et al. also discusses a combination joint adjust/individual adjust mechanism for use with binoculars to permit them to be focused by a user employing only one hand. For this purpose, a single control knob is provided. The joint adjust mechanism is engaged when two setting rings are in a coupled configuration, while individual focus is implemented when the setting rings are uncoupled. Longitudinal adjustment of objective assembly position is also employed in focusing these patented binoculars. Individual adjustment of both objectives cannot be conducted at the same time, however. In addition, the prior art binoculars exhibit an articulated central portion.

U.S. Pat. Nos. 4,080,042 issued to Hornschu et al.; 4,080,043 issued to Altenheiner et al.; 4,087,153 issued to Hengst; 4,436,387 issued to Shimizu; and 4,998,357 issued to Farnung et al. appear to discuss central, but not individual, focus binocular designs. Some of these prior art apparatus exhibit a hinged, foldable or otherwise collapsible central portion.

SUMMARY OF THE INVENTION

The present invention provides binoculars capable of simultaneous individual focus and simultaneous individual focus (SIF) mechanisms therefor. The binoculars of the present invention simulate the ease of center focus and combat parallax that results from misalignment of the optical axis and the mechanical axis of the binocular tubes. Preferably, the binoculars of the present invention are offset hinged in the bridging portion to accommodate various users and for compactness. Also preferably, the binoculars of the present invention employ a substantially waterproof sealed structure.

Embodiments of the present invention employ independent dual SIF mechanisms that include an adjustment knob, a bezel and a focus shaft to garner the aforementioned and additional advantages. The SIF mechanism precisely translates the rotational motion of the knob into a change in objective-to-eyepiece separation in the longitudinal direction. As a result of the independence of the SIF mechanisms, the binocular tubes are simultaneously and individually focusable. In addition, the dual adjustment knob configuration simulates the ease of center focus, single knob binocular configurations in that focus of the binocular set is achievable by a user, who is looking through the binocular set held in position for observation. The longitudinal relative displacement of the objective and eyepiece results in continued substantial alignment of the optical and mechanical axes of the binocular tubes, thereby decreasing the effect of parallax resultant from misalignment of those axes.

Further advantages are provided by embodiments of the present invention employing an offset hinge. Such a hinge facilitates compactness for storage, transport or other non-use purposes. Binocular configurations achievable in the practice of these embodiments range between a zero-pivot, maximum eye spacing arrangement and a maximum-pivot, minimum area arrangement. When the offset hinge is structured to resist pivoting in response to the application of small amounts of force, the binocular sets of the present invention are capable of remaining in storage position (i.e., maximum pivot position) or adjusted for the particular eye spacing of an individual user despite inadvertent, small magnitude force applications thereto.

The binoculars of the present invention may be rendered waterproof by employing an objective lensholder of a length sufficient to permit SIF mechanism interface with the objective lensholder outside the dry gas chamber thereof. This is accomplished by deploying an O-ring bore at the rearward end of the extended length objective lensholder and provide SIF mechanism interface forward of that O-ring bore. In this manner, the position of the objective assembly may be altered during focussing without disrupting the waterproof seal.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings in which.

DESCRIPTION OF PREFERRED EMBODIMENTS

Figure 1:
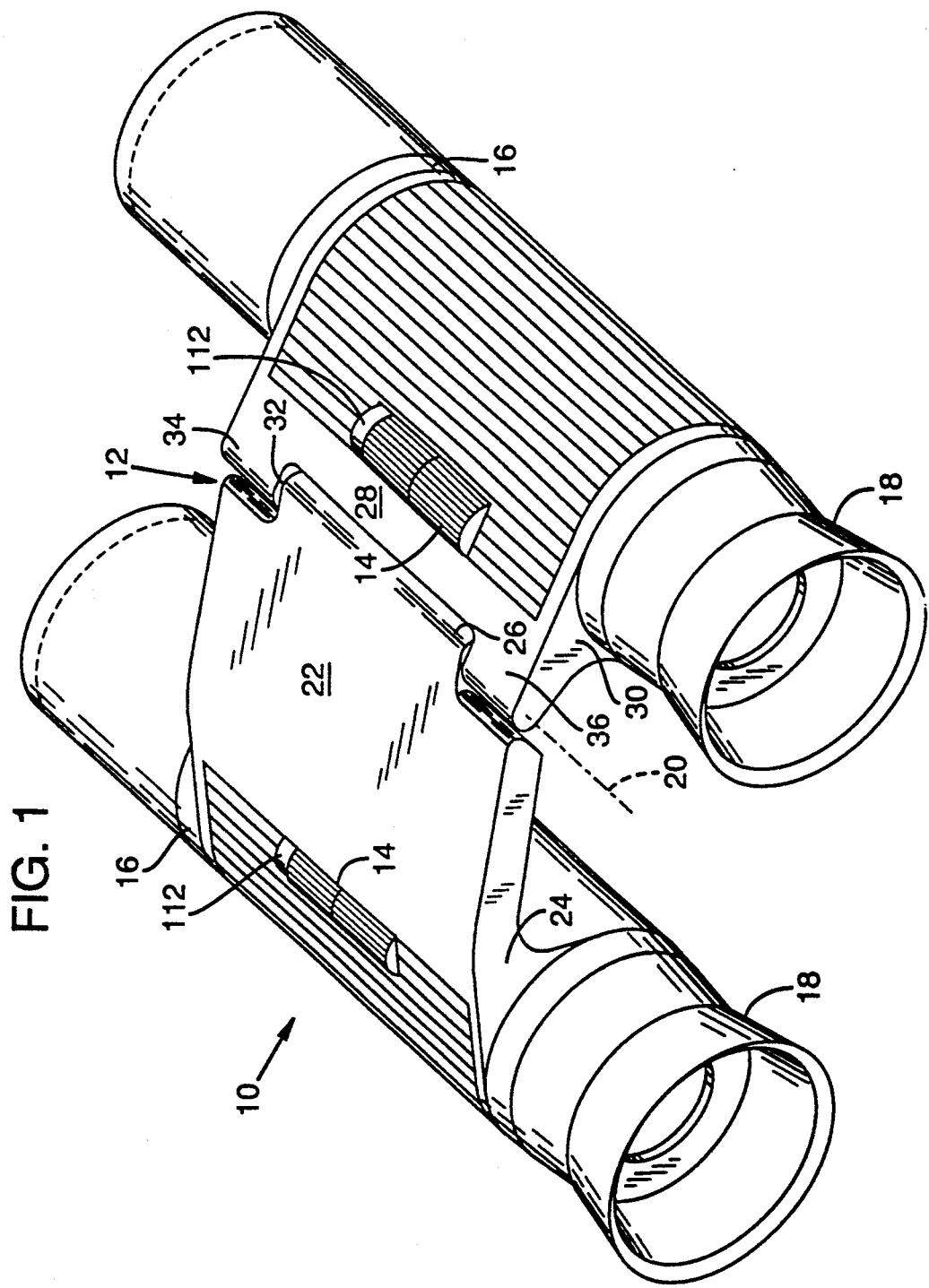
FIG. 1 is a top right isometric view of an embodiment of the binoculars of the present invention.

For the purposes of the following description, the term "rearward" means in the direction of or toward the eyepieces, while the term "forward" connotes the opposite. Also, the terms "right" and "left" are used in the normal sense from the perspective of a person having a binocular set oriented with the eyepieces pointed toward them. In FIG. 1, for example, the lower binocular tube is the "left," and, if axis 20 had an arrow at the end that is not contacting the apparatus, that arrow would point "rearward."

FIG. 1 depicts the exterior (i.e.. housing) of a preferred embodiment of the present invention. The general external configuration of a binocular set 10 corresponds to that of conventional binoculars, in that two refractory telescope structures are connected by a bridging portion. A binocular set 10 of the present invention is shown in FIG. 1 with an offset hinge 12 and an individual adjustment knob 14 for each of a set of two binocular tubes 16. A set of two eyepieces 18 are located at one end of binocular tubes 16.

A preferred embodiment of the present invention includes a hinged bridging portion. More preferably as depicted in FIG. 1, binocular sets 10 include offset hinge 12 capable of pivoting about a pivot axis 20 to permit a user to alter the distance between eyepieces 18 from a zero-pivot, maximum eye spacing to a lesser spacing, if necessary, to accommodate individual user eye spacing. In addition, the preferred maximum pivot position of offset hinge 12 about axis 20 places binocular set 10 in a compact configuration, where binocular tubes 16 are deployed in a closely adjacent manner. The angle of maximum pivot ranges from about 25 degrees to about 170 degrees. Such a compact arrangement provides convenient transport or storage, for example, of binocular set 10. Binocular tubes 16 may or may not contact each other when arranged in the compact configuration.

Preferably, offset hinge 12 is structured so that the configuration of binocular set 10 remains fixed, despite the application of small amounts of force thereto. In this manner, a user configured binocular set 10 having a specific relative binocular tube 16 position may be used and subject to a degree of jostling without substantial alteration to the relative position. As a result, the number of user readjustments of relative binocular tube 16 spacing necessary in operation of binocular sets 10 may be reduced.

Offset hinge 12 preferably includes a major portion 22 having one longitudinal end 24 integrally formed with a first binocular tube 16 and an extended member 26 located in the bridging portion of the opposed longitudinal end thereof; and a minor portion 28 having one longitudinal end 30 integrally formed with a second binocular tube 16, an inset portion 32 adapted to pivotally receive extended member 26 therein, a first anchoring member 34 and a second anchoring member 36 formed in the opposed longitudinal end thereof.

Pivotal operable connection of extended member 26 and inset portion 32 may be achieved in any convenient manner. For example, a connecting pin (not shown) may pass through a pin channel (not shown) formed in extended member 26, with each end of the pin being pivotally anchored in first and second anchoring members 34 and 36. For example, a non-threaded first anchoring member 34 and a threaded second anchoring member 36 may be employed to accomplish such pivotal connection.

The components of offset hinge 12 may be formed of any convenient material therefor by any convenient fabrication technique. Preferably, offset hinges 12 are formed of the same or similar material as the rest of the housing of binocular sets 10. One of ordinary skill in the art is capable of selecting an appropriate offset hinge 12 material and fabricating offset hinges 12 useful in the practice of the present invention.

Preferably, the housing of binocular sets 10 is formed of metal, with each binocular tube 16 formed integrally with a portion of offset hinge 12. The housing of the present invention may be formed of any convenient material therefor, however, including metals such as steel, magnesium, aluminum or the like as well as other materials such as plastic, a composite material or the like, by any convenient fabrication technique. One of ordinary skill in the art would be able to select an appropriate housing material and fabricate housings useful in the practice of the present invention.

Figure 2:
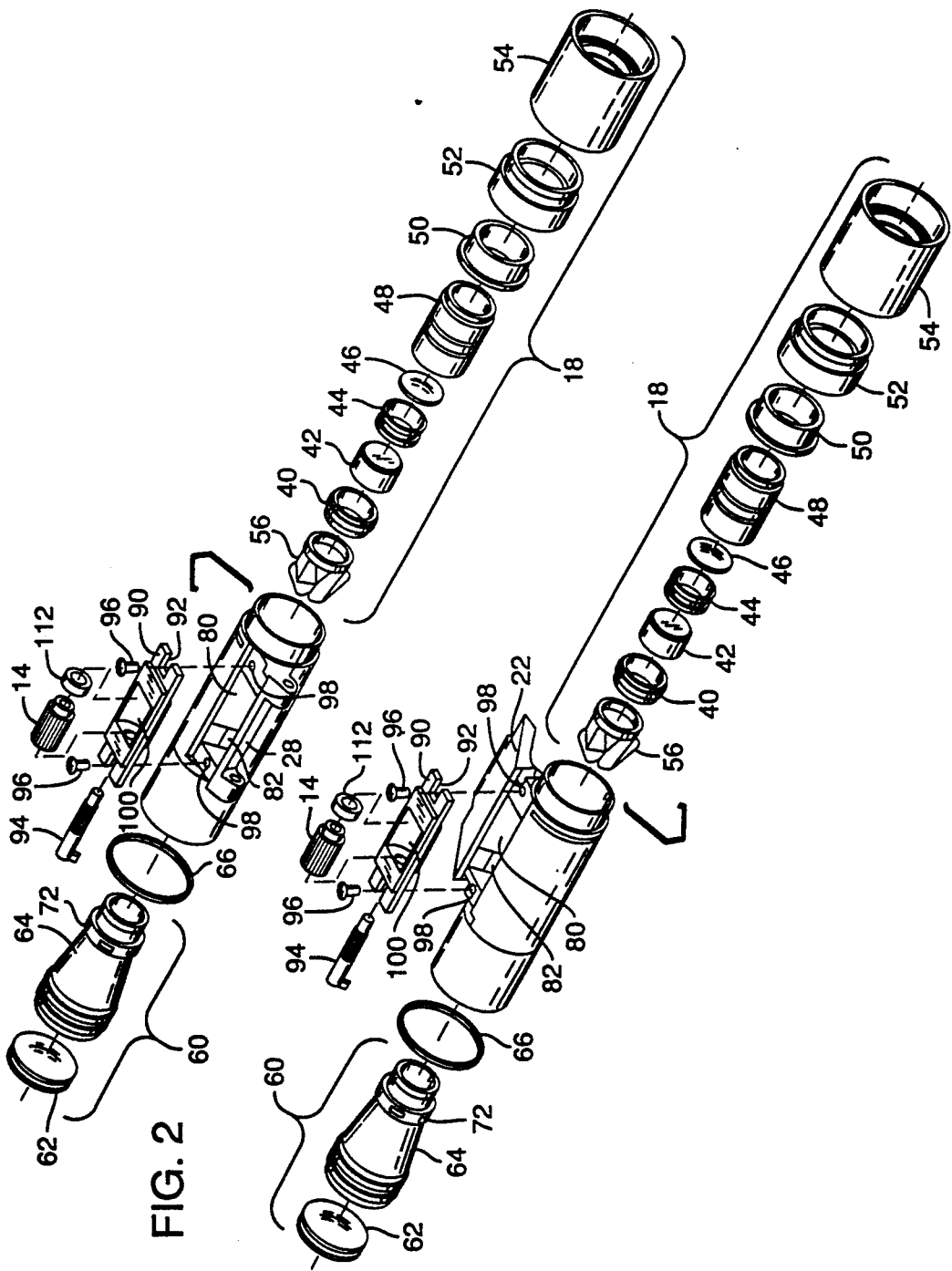
FIG. 2 is a top left exploded view of an embodiment of the binoculars of the present invention.

FIG. 2 shows an exploded view of a preferred embodiment of the present invention. Since the configuration of binocular set 10 is substantially the same for each binocular tube 16 with the exception of the offset hinge 12 components, one exemplary binocular tube 16 is discussed below, and the aforementioned exception is noted when appropriate. As a result of this structural arrangement, binocular tubes 16 of the present invention may be simultaneously and individually focussed.

Eyepiece 18 preferably includes a locknut 40, a first eyepiece lens 42, a spacer 44, a second eyepiece lens 46, an eyepiece lensholder 48, an adjustment flange 50, a lockring 52 and an eyecup 54. First eyepiece lens 42 and second eyepiece lens 46 are separated by spacer 44, and the three components are positioned within eyepiece lensholder 48 and secured in place by locknut 40. Adjustment flange 50 provides for mechanical communication between eyepiece lensholder 48 and lockring 52, which secures eyepiece lensholder 48 to binocular tube 16. Eyecup 54 is adjustably attached to lockring 52. Eyepiece lensholder 48 is also fixedly connected to a prism 56. Eyepiece 18 is located within binocular tube 16 at the rearward end. Eyepiece 18 is operably connected to binocular tube 16 in any convenient manner therefor. For example, the exterior of binocular tube 16 may be threaded to interface with internal threading of lockring 52. If necessary or desirable, O-rings (not shown) may be employed in eyepiece 18 construction to protect the internal components thereof from dirt, sand, grit, water, water vapor or the like.

Some individual components of eyepieces 18, such as the O-rings, useful in the practice of the present invention are known and commercially available. Also, alternative eyepiece 18 component(s) or structure may be employed in the practice of the present invention. The remaining components of eyepieces 18 may be custom manufactured using known techniques. A practitioner in the art is capable of selecting or constructing appropriate components for incorporation into an eyepiece 18 useful in the practice of the present invention.

An objective assembly 60 is located at the forward end of binocular tube 16 and includes an objective lens 62 and an objective lensholder 64. Objective lens 62 is housed within objective lensholder 64. Objective lens 62 is therefore sized and configured to fit within objective lensholder 64. Objective lens 62 may be anchored within objective lensholder 64 through the use of adhesive, a lockring, a rolled over edge of objective lensholder 64 or the like, with adhesive being preferred. In the depicted configuration, a trim ring 66 is sized and configured to fit about the outer circumference of binocular tube 16. Any other structure capable of retaining objective lens 62 within objective lensholder 64 may be employed in the practice of the present invention.

Figure 3:
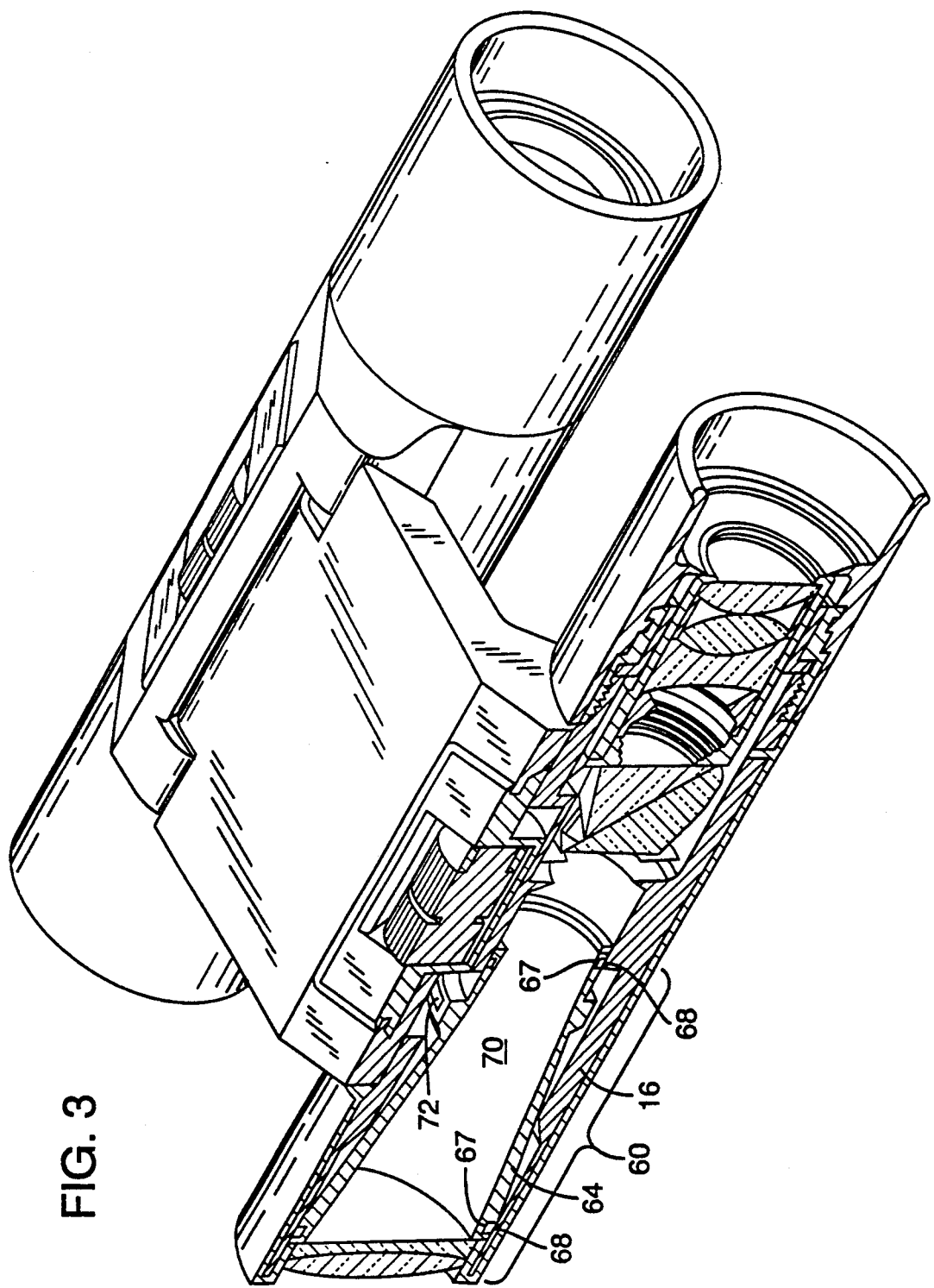
FIG. 3 is an isometric cutaway view of an embodiment of the present invention, including a binocular tube and an objective lensholder.

Objective lensholder 64 is longer than required for lens retention to provide for sealing mechanism described below. The added length of the objective lensholders of the present invention renders binocular sets 10 substantially waterproof, because the optics can be focussed while seal is maintained. Such a seal may be achieved by the use of O-rings to protect the internal components thereof from dirt, sand, grit, water, water vapor or the like. More specifically as shown in FIG. 3, an O-ring glan 67 is provided at or near the rearward end of objective lensholder 64. O-ring glan 67 cooperates with an O-ring 68 to form a seal permitting the interface of a simultaneous individual focus (SIF) mechanism of the present invention with the objective lensholder at a location 72 outside the dry gas chamber 70 of objective lensholder 64.

Objective lensholder 64 is operably connected to binocular tube 16, such that objective lensholder 64 is capable of longitudinal motion relative to eyepiece 18. Preferably, objective lensholder 64 is incapable of substantial radial or rotational motion. Binocular tube 16 is sized and configured to maintain objective lensholders 64 at a location parallel to the hinge (e.g., within about 1' per side) to insure collimation maintenance in all focus positions. This requirement may be met in the practice of the present invention as shown in FIG. 3, by seating O-rings 68 in O-ring glans 67 located at the forward and rearward ends of objective lensholder 64. The diameters of O-ring bores in binocular tubes 16 at the location of the seated O-rings are preferably parallel to the hinge within the range of about 0.25 degrees. Objective lens 62 seat area at the forward end of objective lensholder 64 is perpendicular to axis formed by O-ring seats, within about 0.25 degrees. Close tolerances provide smooth, precise O-ring bores to center objective lensholder 64 within binocular tube 16. Any other structure capable of facilitating control of the precise longitudinal path length of objective lensholder 64 may also be employed in the practice of the present invention.

Preferably, objective lensholder 64 is provided with a longitudinal adjustment means 72, such as the focus groove depicted in FIG. 2. Longitudinal adjustment means 72 interfaces with the SIF mechanism of the present invention to accomplish precise longitudinal adjustment of the objective-to-eyepiece separation in a manner responsive to user tuning, as is more fully discussed below. While the specific structure of longitudinal adjustment means 72 depends upon that of the SIF mechanism component which interfaces therewith, any longitudinal adjustment means 72 capable of such an interface may be used in the practice of the present invention.

The individual components of objective assemblies 60 useful in the practice of the present invention, such as O-rings are known and commercially available. Also, alternative objective assembly 60 component(s) or structure may be employed in the practice of the present invention. The remaining components of objective assemblies 60 may be custom manufactured using known techniques. A practitioner in the art is capable of selecting or constructing appropriate components for incorporation into objective assemblies 60 in accordance with the present invention.

The present invention involves an SIF mechanism. The SIF mechanism is preferably contained within a SIF housing portion 80 of binocular tube 16. SIF housing portion 80 is preferably integrally formed with binocular tube 16, but may alternatively be independently fabricated and affixed to binocular tube 16 by any convenient means therefor. In any event, SIF housing portion 80 preferably includes an access 82, which provides an avenue for objective lensholder 64SIF mechanism interface.

In embodiments of the present invention that include offset hinge 12, the structural environment of SIF housing portions 80 is not the same for both binocular tubes 16. For one binocular tube 16 (e.g., the left tube as shown in FIGS. 1 and 2), SIF housing portion 80 is formed integrally with major offset hinge portion 22. The second binocular tube 16 (i.e., the right tube as shown in FIGS. 1 and 2), in contrast, is formed integrally with minor offset hinge portion 28.

The SIF mechanism of the present invention includes a knob 14, a bezel 90 optionally having one or more attachment grooves 92 formed thereon and a focus shaft 94. The SIF mechanism provides operable connection between knob 14 and focus shaft 94, precisely translating rotational motion of knob 14 into longitudinal displacement of focus shaft 94. Binocular tube 16 interfaces with the SIF mechanism to stably anchor the SIF mechanism. This interface is accomplished, in part, through an attachment means 96 and an affixation means 98 that is integral with binocular tube 16 in the embodiment of the present invention shown in FIG. 2. Interface between objective lensholder 64 and the SIF mechanism facilitates focus achievement in a manner substantially devoid of parallax caused by misalignment of the mechanical and optical axes of binocular tube 16. More specifically, rotation of each knob 14 results in longitudinal displacement of corresponding objective lensholder 64.

Knob 14 is housed within a knob pocket 100 formed in bezel 90. Knob 14 is preferably sized and configured to provide sufficient surface area for manipulation by a user and to fit within knob pocket 100, with the knob groove fitting snugly over knob support 111 (FIG. 4b) restricting longitudinal motion of knob 14 while capable of unencumbered rotation therein. To enhance user manipulability, the surface of knob 14 may be formed with ridges or other protrusions. Substantially smooth surfaced knobs 14 may also be employed, however.

Knobs 14 useful in the practice of the present invention preferably include an interior threaded portion (not shown) that precisely interfaces with an exterior threaded portion of focus shaft 94. Knobs 14 are preferably formed of plastic, optionally with a metallic internal threaded portion. Any convenient material such as acetal, aluminum, magnesium, nylon or the like may be used to form knobs 14; however, and a practitioner in the art is capable of fabricating and implementing knobs 14 in accordance with the present invention.

Knobs 14 are preferably deployed at or near the longitudinal center point of binocular tube 16 (including eyepiece 18). More preferably, knobs 14 are deployed at or near the longitudinal center point of offset hinge 12. Alternative knob 14 locations may also be employed in the practice of the present invention.

Focus shafts 94 are configured to provide precise translation of rotation of knobs 14 in both the clockwise and counterclockwise directions into forward and reverse longitudinal displacement. To accomplish such precise translation, focus shaft 94 is sized and configured to pass through an opening (not shown) in knob pocket 100 as well as to precisely and threadedly engage an interior threaded portion (not shown) of knob 14. Preferably, focus shaft 94 is both left and right threaded to permit deployment of focus shaft 94 in either binocular tube 16.

Focus shafts 94 are preferably formed of plastic, light weight metals or the like, so long as focus shafts 94 exhibit sufficient strength and durability for use in the practice of the present invention. Any convenient material such as acetal, nylon or the like may be used to form focus shafts 94; however, and a practitioner in the art is capable of fabricating and implementing focus shafts 94 in accordance with the present invention.

Figure 4A:
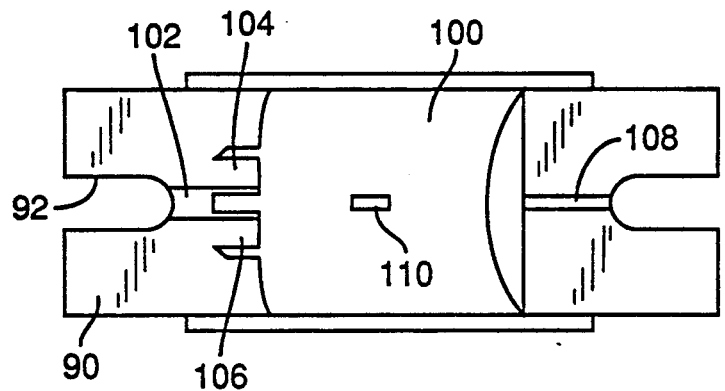
FIG. 4a is a bottom view of a bezel-focus shaft structure of a preferred embodiment of the present invention.
Figure 4B:
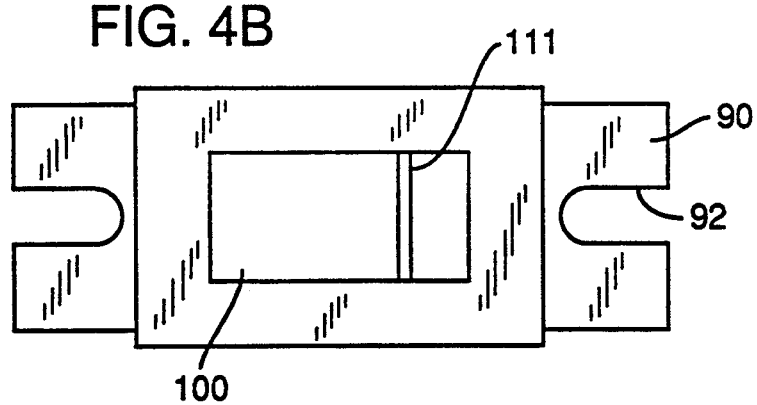
FIG. 4b is a top view of a bezel-focus shaft structure of a preferred embodiment of the present invention.

As shown in FIG. 4a, the bottom portion of bezel 90 is also preferably configured to permit the use thereof with either binocular tube 16. Specifically, bezel 90 includes a focus shaft head track 102 which splits into a right lane 104 and a left lane 106. Focus shaft 94 is therefore preferably sized and configured, so that the head thereof is capable of travel along focus shaft head track 102, in forming SIF mechanisms in accordance with the present invention, and, in operation thereof, along either right lane 104 or left lane 106. For left binocular tube 16, the corresponding knob 14, bezel 90 and focus shaft 94 are operably connected, such that head of focus shaft 94 travels in left lane 104 upon adjustment of knob 14. Similarly for right binocular tube 16, the corresponding knob 14, bezel 90 and focus shaft 94 are operably connected, such that the head of focus shaft 94 travels in right lane 106 upon adjustment of knob 14. Preferably, left and right lanes 104 and 106 are of a length greater than or equal to the maximum longitudinal travel for focus purposes (i.e., the distance between the maximum and minimum object-to-eyepiece distances of which binocular set 10 is capable). Exemplary maximum distances are from about 4.59 inches to about 4.60 inches. Exemplary minimum distances are from about 4.40 inches to about 4.41 inches, which accommodates a 10 power system focusing from 15 feet (+4 diopter) to infinity (−4 diopter). Other ranges may be used to accommodate other system requirements. In this manner, objective lensholder 64 longitudinally displaces along with focus shaft 94.

As discussed previously, preferred objective lensholders 64 have longitudinal adjustment means 72. The head of focus shaft 94 is sized and configured to interface with longitudinal adjustment means 72 (e.g., a focus groove as shown in FIG. 2) through an access 82 formed in SIF mechanism housing portion 80, when the SIF mechanism is properly anchored to binocular tube 16. In the depicted embodiment of the present invention, for example, focus shaft 94 is cylindrical with a substantially trapezoid shaped protrusion at the head portion thereof culminating in substantially rectangular contact surface, while longitudinal adjustment means is a rounded corner rectangle having a width slightly greater than the rectangular contact surface of the head portion of focus shaft 94. Access 82 may be of any convenient size or shape, provided that longitudinal adjustment means 72-focus shaft 94 interface remains possible over the maximum longitudinal travel for focus purposes.

As shown in FIGS. 1 and 2 and discussed above, the head of focus shaft 94 directly interfaces with longitudinal adjustment means 72 to accomplish longitudinal displacement of objective lensholder 64. While such a direct interface is preferred, the interface may also be indirect (i.e., an interfacing component may be operably connected to either focus shaft 94 or objective lensholder 64 or mutually engagable interfacing components may be operably connected to focus shaft 94 and objective lensholder 64).

Longitudinal motion of focus shaft 94 is important in decreasing parallax caused by misalignment of optical and mechanical binocular tube 16 axes, as is caused in some prior art devices by rotation of the optical elements (eyepiece or objective) to achieve focus. Bezel 90 therefore also preferably includes a focus shaft track 108 and an alignment means 110, such as the protrusion depicted in FIG. 4a. Focus shaft track 108 is disposed forward of right and left lanes 104 and 106 and runs along the remaining length of bezel 90 in that direction. The primary function of focus shaft track 108 is to further insure that focus shaft 94 exhibits longitudinal motion, with substantially no radial or rotational component.

Alignment means 110 interfaces with a corresponding structure (not shown) formed in or formed independently but affixed to SIF housing portion 80 of binocular tube 16. For use with a protrusion-type alignment means 110, an indentation of substantially the same size and configuration as the protrusion is preferably formed in SIF housing portion 80. Preferably, alignment means 110 is deployed at or near a location corresponding to the longitudinal center point of knob 14. Any other alignment facilitating mechanisms may be employed in the practice of the present invention to provide predominant longitudinal focus shaft 94 motion.

Bezels 90 are preferably formed of plastic as a single component to provide the operable connections between the components of the SIF mechanism as well as binocular tube 16 and objective lensholder 64. Any convenient material such as acetal, nylon, magnesium or the like may be used to form bezels 90; however, and a practitioner in the art is capable of fabricating and implementing bezels 90 in accordance with the present invention.

The SIF focus mechanism is primarily anchored to binocular tube 16 through attachment means 96 and affixation means 98. For example, attachment means 96 may constitute one or more small screws, with affixation means 98 including one or more receptacles formed integrally with binocular tube 16 and adapted to receive such screws. In this embodiment, the smaller, threaded portion of the screw(s) passes through attachment groove 92 into threaded engagement with the receptacle(s) therefor, while the head(s) of the screw(s) interface with attachment groove 92 to facilitate stable affixation of bezel 90 to binocular tube 16. Any other attachment means 96 or affixation means 98 may be employed in the practice of the present invention, provided the SIF mechanism is stably anchored to binocular tube 16 thereby.

The individual components useful in SIF mechanisms of the present invention may be fabricated in accordance with the description set forth above using known techniques. Also, alternative SIF mechanism component(s) or structure may be employed in the practice of the present invention. A practitioner in the art is capable of constructing appropriate components for incorporation into SIF mechanisms of the present invention.

In operation, the SIF mechanism of the present invention preferably functions as described below. A user rotates one or both knobs, and the interior threads of each rotated knob mesh with exterior threads of a focus shaft to longitudinally displace the focus shaft. Since the head of the focus shaft preferably passes through an access in the body of the binocular tube and interfaces with a longitudinal adjustment means of the objective lensholder, the objective lens is longitudinally displaced by the same distance as the focus shaft. As a result of the fixed position of the eyepiece and the location of the objective lens within the objective lensholder, longitudinal movement of the objective lensholder results in a change in objective-to-eyepiece separation in the longitudinal direction, without rotating the objective lens or either of the eyepiece lenses. Consequently, focus of the binocular tubes is simultaneously achievable, absent substantial introduction of parallax resulting from misalignment of the optical and mechanical axes of the binocular tubes.

Optionally, knob 14 is operably connected to a diopter marking band 112, such that a user is able to "preset focus" binocular tube 16 for a distance at which the user often makes observations. For use in the practice of the present invention, it is preferred that diopter marking band 112 generally rotate as knob 14 rotates. When a screwdriver, key or other similar implement is placed in a slot or other structure formed in diopter marking band 112, band 112 ceases to rotate with actuation of knob 14. Any convenient structure and method for reversibly disrupting knob 14-diopter marking band 112 simultaneous rotation may be employed. Preferably, the knob 14-diopter marking band 112 assembly is housed within knob pocket 100. In such embodiments of the present invention, knob pocket 100 is sized and configured to house knob 14 and diopter marking band 112 while permitting rotation thereof.

To achieve preset focus in accordance with this embodiment of the present invention, rotation of diopter marking band 112 is interrupted; knob 14 is rotated (i.e., objective-to-eyepiece distance is altered) independently of diopter marking band 112, until focus at the desired observation distance is achieved; and diopter marking band 112 rotation is reinstated. The preset focus position may be indicated on diopter marking band 112, on the surface of bezel 90 at a location closely adjacent to diopter marking band 112 or both. Visual or tactile preset focus position indicators are employed by a user to quickly focus the binoculars for observations to be made at the preset distance, without the necessity of looking through eyepieces 18. Preferably, the user aligns the slot or other structure used to interrupt diopter marking band 112 rotation with an indicator (not shown) on bezel 90 to achieve the preset objective-to-eyepiece distance.

Diopter marking bands 112 are preferably formed of the same material as knobs 14; however, other materials may be employed for this purpose. Diopter marking bands 112 useful in the practice of the present invention are known and used in the art or may be fabricated using known techniques, and a practitioner in the art is capable of constructing or selecting and implementing diopter marking bands 112 in accordance with the present invention.

In operation, a user preferably grasps the binocular set with both hands, thereby providing access to both of the adjustment knobs. The binocular sets of the present invention therefore simulate the ease of center focus, because the user can manipulate the knobs, while holding the binoculars in a manner suitable for observation. Upon raising the binocular set to his or her eyes, the user may, if necessary, exert force on the individual binocular tubes, so that they pivot about the offset hinge axis to align the eyepieces with the user's eyes. The user may simultaneously manipulate the two adjustment knobs to focus the image. Alternatively, the user may sequentially manipulate the adjustment knobs or utilize a combination of simultaneous and sequential adjustment knob manipulations to focus the binoculars.

In either event, the knobs are preferably configured, such that movement of the knobs toward the center of the binocular set (i.e., clockwise for the left binocular tube and counterclockwise for the right binocular tube) results in longitudinal motion of the objective assembly that increases the objective-to-eyepiece separation, thereby focusing closer distances. To focus a farther distance, the knobs are moved away from the center of the binocular set (i.e.. counterclockwise for the left binocular tube and clockwise for the right binocular tube), decreasing the objective-to-eyepiece separation. Alternatively, the binoculars can be arranged, such that the same direction of rotation results in same direction objective assembly longitudinal displacement.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A simultaneously and individually focusable binocular apparatus, comprising:
   a left binocular tube and a right binocular tube, each having a forward end and a rearward end;
   an objective assembly disposed within each binocular tube at or near the forward end thereof and capable of displacement in a longitudinal direction with respect to the binocular tube;
   an eyepiece fixedly connected to each binocular tube at or near the rearward end thereof; and a pair of simultaneous individual focus mechanisms, one of said pair of simultaneous individual focus mechanism being operably connected to each binocular tube and responsive to user input and engagable with the objective assembly to generate objective assembly longitudinal displacement corresponding to the user input, each simultaneous individual focus mechanism including an adjustment knob responsive to user input, a bezel capable of housing the adjustment knob and fixedly connected to the binocular tube, and a focus shaft operably connected to the adjustment knob and engagable with the objective assembly to precisely translate the user input into longitudinal displacement of the objective assembly, the adjustment knobs, bezels and focus shafts employed for both the left and right binocular tubes being structurally the same but operably connected to achieve same longitudinal direction objective assembly displacement upon opposite direction rotation of the adjustment knobs.

2. A binocular apparatus according to claim 1 wherein the adjustment knob and focus shaft are operably connected so that user input resulting in rotation of the adjustment knob about an axis generates longitudinal motion of the focus shaft in a direction generally parallel to the axis.

3. A binocular apparatus according to claim 1 wherein the longitudinal displacement of the objective assembly corresponds to longitudinal displacement of the focus shaft.

4. A binocular apparatus according to claim 1 wherein a clockwise rotation of one binocular knob and a counterclockwise rotation of the other binocular knob generate forward longitudinal displacement of the corresponding objective assemblies, thereby focusing closer distances.

5. A binocular apparatus according to claim 1 wherein a counterclockwise rotation of one binocular knob and a clockwise rotation of the other binocular knob generate rearward longitudinal displacement of the corresponding objective assemblies, thereby focusing farther distances.

6. A binocular apparatus according to claim 1 wherein the simultaneous individual focus mechanism further comprises a diopter marking band to achieve preset focus.

7. A binocular apparatus according to claim 1 wherein the simultaneous individual focus mechanism is disposed within a housing therefor formed integrally with or operably connected to the binocular tube.

8. A binocular apparatus according to claim 7 wherein the bezel exhibits an alignment means formed integrally therewith or operably connected thereto and capable of cooperation with a complementary alignment structure formed integrally with or operably connected to the focus mechanism housing, thereby enhancing the stability of the focus mechanism with respect to the binocular tube.

9. A binocular apparatus according to claim 1 wherein the focus shaft includes a head portion and a shaft portion and the head portion is engagable with the objective assembly.

10. A binocular apparatus according to claim 9 wherein the bezel includes a head track portion adapted to receive the head portion of the focus shaft and insure that the focus shaft moves along a longitudinal path.

11. In a binocular apparatus having a pair of binocular tubes that each have an objective assembly and an eyepiece at or near opposite ends thereof, a pair of simultaneous individual focus mechanisms, one of said pair of simultaneous individual focus mechanisms being operably connected to each binocular tube, comprising:

an adjustment knob responsive to user input to rotate about a rotational axis, a bezel capable of housing the adjustment knob and fixedly connected to the binocular tube, and a focus shaft operably connected to the adjustment knob to precisely translate the user input into longitudinal displacement between the objective assembly and the eyepiece, the longitudinal displacement being in a direction generally parallel to the rotational axis and the adjustment knobs, bezels and focus shafts employed for both the binocular tubes being structurally the same.

12. A focus mechanism according to claim 11 wherein the adjustment knobs, bezels and focus shafts employed for both the binocular tubes are operably connected to achieve same longitudinal direction displacement upon opposite direction rotation of the adjustment knobs.

13. A focus mechanism according to claim 11 wherein the focus shaft includes a head portion and a shaft portion and the head portion is engagable with the objective assembly.

14. A focus mechanism according to claim 13 wherein the bezel includes a head track portion adapted to receive the head portion of the focus shaft and insure that the focus shaft moves along a longitudinal path.

15. A focus mechanism according to claim 11 wherein the eyepiece of each binocular tube is fixedly connected thereto and the objective assembly is capable of displacement in the longitudinal direction with respect to the binocular tube.

* * * * *